United States Patent
Best

(10) Patent No.: US 7,586,228 B2
(45) Date of Patent: Sep. 8, 2009

(54) STATOR OF AN ELECTRIC MOTOR

(75) Inventor: Dieter Best, Ingelfingen (DE)

(73) Assignee: EBM-PAPST Mulgingen GmbH & Co. KG, Mulfingen (DE)

( * ) Notice: Subject to any disclaimer, the term of this patent is extended or adjusted under 35 U.S.C. 154(b) by 494 days.

(21) Appl. No.: 11/348,631

(22) Filed: Feb. 7, 2006

(65) Prior Publication Data

US 2006/0175926 A1 Aug. 10, 2006

(30) Foreign Application Priority Data

Feb. 7, 2005 (EP) .................... 05100817

(51) Int. Cl.
*H02K 1/04* (2006.01)

(52) U.S. Cl. .............. 310/90; 310/91; 310/67 R; 310/254; 310/71; 310/218; 310/259; 417/423.12

(58) Field of Classification Search ............ 310/90, 310/91, 67 R, 254, 71, 218, 259; 417/423.12
See application file for complete search history.

(56) References Cited

U.S. PATENT DOCUMENTS 4,129,796 A * 12/1978 Papst ................. 310/43

5,663,604 A 9/1997 Takahashi
6,204,583 B1 3/2001 Sasaki et al.
6,300,695 B1 * 10/2001 Neal .................. 310/68 D

FOREIGN PATENT DOCUMENTS

| DE | 26 26 539 | 12/1977 |
| DE | 27 12824 C2 | 3/1986 |
| DE | 39 05 773 A1 | 9/1990 |
| DE | 43 22 575 A1 | 1/1995 |
| DE | 36 29 049 C2 | 2/1998 |
| DE | 20021796 U1 | 5/2002 |
| EP | 0 769 840 B1 | 12/2000 |

* cited by examiner

*Primary Examiner*—Gary F. Paumen
(74) *Attorney, Agent, or Firm*—Brinks Hofer Gilson & Lione

(57) ABSTRACT

The invention relates to a stator of an electric motor, comprising a laminated stator core (1) which is provided with electrical insulation (8) composed of plastic, and a stator bushing (3) which can be pressed into a central axial opening (2) in the laminated stator core (1), forms a bearing seat for a rotor shaft (10) and is composed of metal. In order to reduce the manufacturing complexity, with the aim at the same time to reduce the amount of noise developed and to improve the electrical insulation of the bearing seat, the invention proposes that the laminated stator core (1) and the metallic stator bushing (3) which is pressed into the laminated stator core (1) are at least partially surrounded by a extrusion coating (8), which is composed of plastic and forms the insulation (8).

16 Claims, 4 Drawing Sheets

STATOR OF AN ELECTRIC MOTOR

CROSS REFERENCE TO RELATED APPLICATION

This application claims priority to European Patent Application EP 05100817.5-2207, filed Feb. 7, 2005.

FIELD OF THE INVENTION

The invention relates to a stator of an electric motor, of a type with a laminated stator core which is provided with electrical insulation, and a stator bushing which can be pressed into a central axial opening in the laminated stator core, and forms a bearing seat for a rotor shaft.

BACKGROUND

Electric motors in which the stator bushings are pushed into the interior of a laminated stator core are known. For example, DE 39 05 773 A1 describes an electric external-rotor motor of this type with a specially designed protective-ground conductor connecting part. In this case, a protective-ground conductor is connected to a laminated stator core via a protective-ground conductor connecting part. The connecting part for this purpose has a center section which extends between a metallic bearing supporting tube and an end insulation shaft of an insulating end plate axially in the direction of the laminated stator core. The connecting part has a first end section, which is connected to the protective ground conductor and extends into a connecting area which is formed between a motor flange and the stator end winding and, for electrical connection, has a second end section which is held with a force fit and/or an interlock by contact with the laminated stator core and with the bearing supporting tube. There is therefore also an embodiment of this generic type in the stator of this known electric motor.

The stator which is known from DE 36 29 049 C2 for an external-rotor motor, has a laminated stator core, stator windings and a motor flange which is arranged on one end face, with the laminated stator core having slots for holding wires of the stator windings, as well as a central, axial aperture opening, into which hollow-cylindrical guide attachments of bearing bushings are inserted from both sides in order to hold shaft bearings for a rotor shaft. In this case, an insulating end plate is in each case arranged directly on the two end faces on the laminated stator core and has a hollow-cylindrical end insulation shaft which axially overhangs the laminated stator core on the end winding face and surrounding the bearing bushing. The insulating end plate which is arranged on the end face opposite the motor flange is formed from plastic integrally with the bearing bushing, its guide attachment and the end insulation shaft. Thus, in comparison with the above-mentioned document, there is also a plastic bearing seat, which can be plugged onto the laminated stator core, on the side facing the bottom of the rotor.

Furthermore, EP 769 840 B1 discloses an electric motor without a commutator but with a pressed-in bearing supporting tube. The motor comprises a stator which is attached to a stator flange and has stator windings, an external rotor which surrounds the stator on its side facing away from the stator flange, and an electronics module which is arranged between the stator flange and the external rotor, with power semiconductors, being provided on a circuit board, for whose cooling a specially arranged and designed hollow-cylindrical heat sink is provided. In this case, insulating end plates which can be plugged on are provided in order to insulate the stator windings from the laminated stator core. A bearing supporting tube, which can be pushed in with the laminated stator core, is provided as the bearing for the rotor shaft.

DE 27 12 824 C2 describes a known stator for an external-rotor motor, in which the insulating means, the bearing holding part and the end-winding support are in the form of an integral plastic injection-molded part and enclose the laminated stator core.

A similar embodiment is also known from DE 43 22 575 A1, which describes a bearing arrangement for small electric motors. In this document, at least one bearing element which is seated in a holder in a bearing holding part of a stator is provided in order to support a rotor such that it can rotate. The holder for the bearing holding part is formed on the one hand by dimensionally stable sections which position the bearing element by making contact at least three circumferentially distributed points, and on the other hand by at least one section which can be deformed elastically in the radial direction and holds the bearing element by means of force-fitting contact. The bearing holding parts are designed in particular from the aspect of ensuring a correct, optimum bearing seat without any special machining of the bearing holders. However, motors such as these with a plastic bearing seat are subject to the problem that they have a tendency to oscillate, and this can in turn lead to undesirable noise being formed.

The present invention is based on the object of providing a stator of the generic type described above, which can be produced with less manufacturing effort, but at the same time with the aim of reducing the amount of noise developed as well as improving the electrical insulation of the bearing seat. A further aim is to additionally make it possible to produce a grounding connection for the stator in a simple manner.

SUMMARY OF THE INVENTION

According to the invention, this object is achieved in that the laminated stator core and the metallic stator bushing which is pressed into the laminated stator core are at least partially surrounded by a common sheath, in particular an extrusion coating, which is composed of plastic and forms the insulation.

The production of the stator according to the invention is simple from the manufacturing point of view. First of all, the metallic stator bushing which, in particular, may be composed of aluminum or steel is pressed into the interior of the laminated stator core. Once this unit has been pressed in, it is then encapsulated with plastic in such a way that, as seen in the axial direction, bearing holders for ball bearings for the rotor shaft are formed on both sides of the laminated stator core. During this process, the laminated stator core is completely extrusion-coated with the exception of its outer circumferential surface so that there is advantageously no longer any need for insulation of the winding wires, with which it can be wound after the extrusion-coating process, from the laminated stator core.

The use of metal as the material for the stator bushing leads to an improvement in the noise in comparison to electric motors with stators as have been described initially, because it is thus possible to attach the laminated stator core in a highly robust manner to the metallic steel bushing. By way of example, it was found in the acoustic testing when using an aluminum bushing that it was possible to achieve a considerable reduction in the noise level in comparison to plastic bearing seats, and it was also possible to considerably improve the noise behavior by the use of a steel stator bushing.

After the insertion of the ball bearings into the bearing holding points, the fitting of a printed circuit board, the making of connecting connections and the fitting of the rotor, the motor can preferably be mounted on the housing or at the installation location by means of attachment screws. The plastic seat for the ball bearings in this case prevents electrical currents from flowing through the bearing elements.

In order to hold the attachment screws, the metallic stator bushing may in one preferred embodiment have post-like attachments with threaded holes which are aligned parallel to the axis. While a special spring element and/or a protective-ground conductor connecting part is required for the protective-ground conductor connection for the electric motor according to DE 39 05 773 A1 as mentioned above or else in the case of the motor which is known from DE 200 21 796 U1, the invention makes it possible to produce a continuous metallic connection between the laminated stator core and the mounting point via the attachment screws which engage in these threaded holes, so that this makes it possible to ground the laminated stator core in a simple manner.

Further advantageous embodiments of the invention are contained in the following description. The invention will be explained in more detail with reference to one exemplary embodiment, which is illustrated in the attached drawing figures, in which:

DETAILED DESCRIPTION OF THE INVENTION

Figure 1:
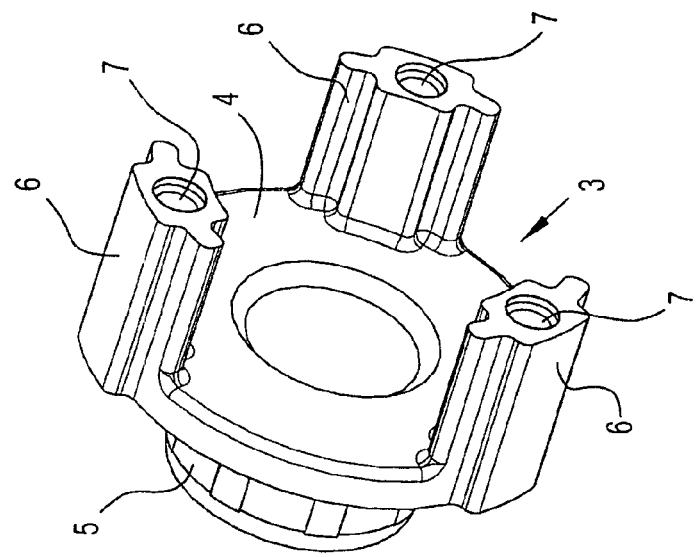
FIGS. 1 to 3 show perspective illustrations of major manufacturing steps in the production of a stator according to the invention.
Figure 1:
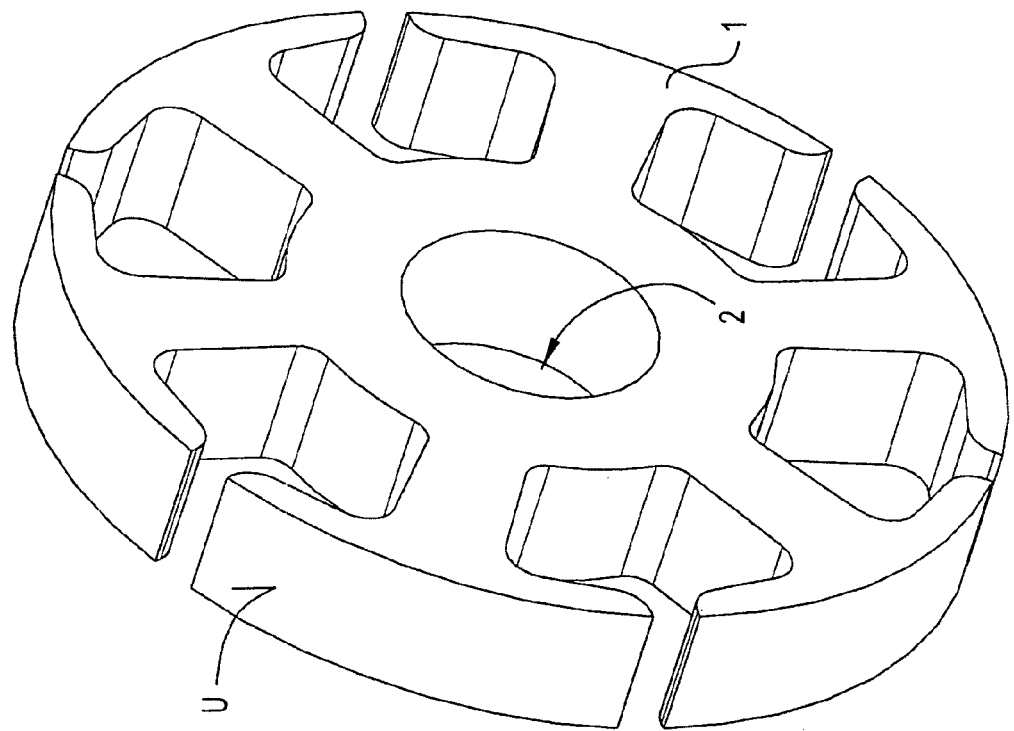

The same parts are provided with the same reference symbols throughout this description as well in the figures of the drawing, so that, in general, they will also each be described only once.

Figure 5:
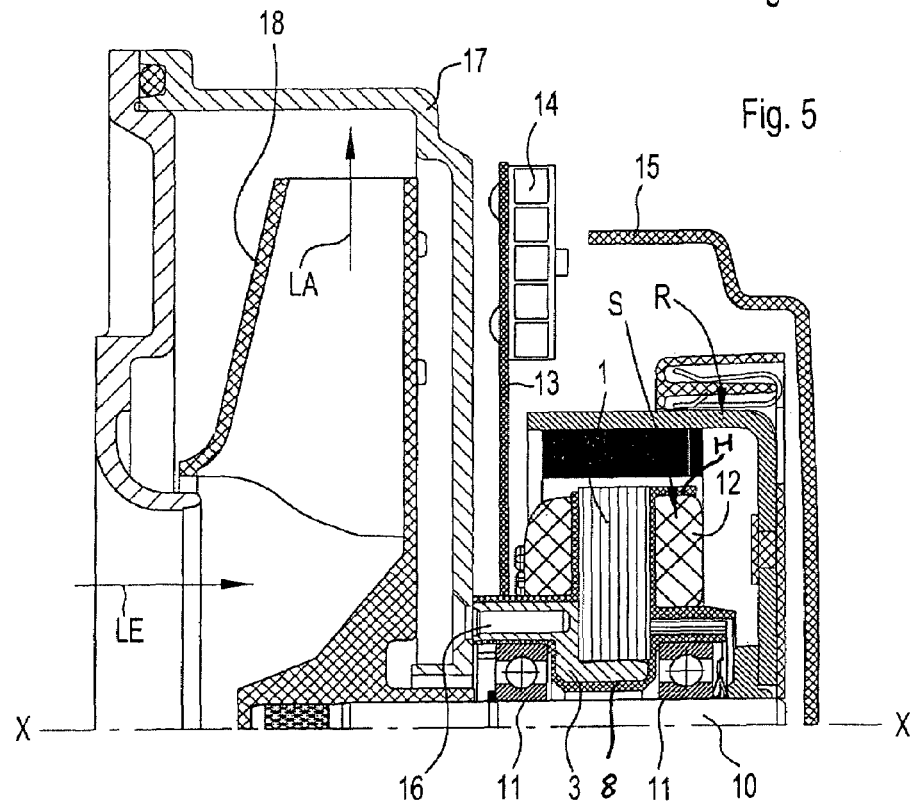
FIG. 5 shows, likewise in the form of a longitudinal section, a radial fan whose electric motor has a stator according to the invention.

As shown first of all in FIG. 1, a stator according to the invention (annotated with the reference symbol S in FIG. 5) of an electric motor, such as the external-rotor motor illustrated in FIG. 5, comprises a laminated stator core 1 and a stator bushing 3 which can be pressed into a central axial opening 2 in the laminated stator core 1.

The stator bushing 3 has a basically annular shape. In this case, starting from a center part 4 which is in the form of a disk or ring a push-in attachment 5 (which is cylindrical in the illustrated embodiment) extends in the axial direction on a side facing the laminated stator core 1 when the parts are assembled. In the illustrated embodiment three post-like attachments 6 extend on the opposite side, with threaded holes 7 which are aligned parallel to the axis, and whose function will be explained in more detail in the following text.

Figure 2:
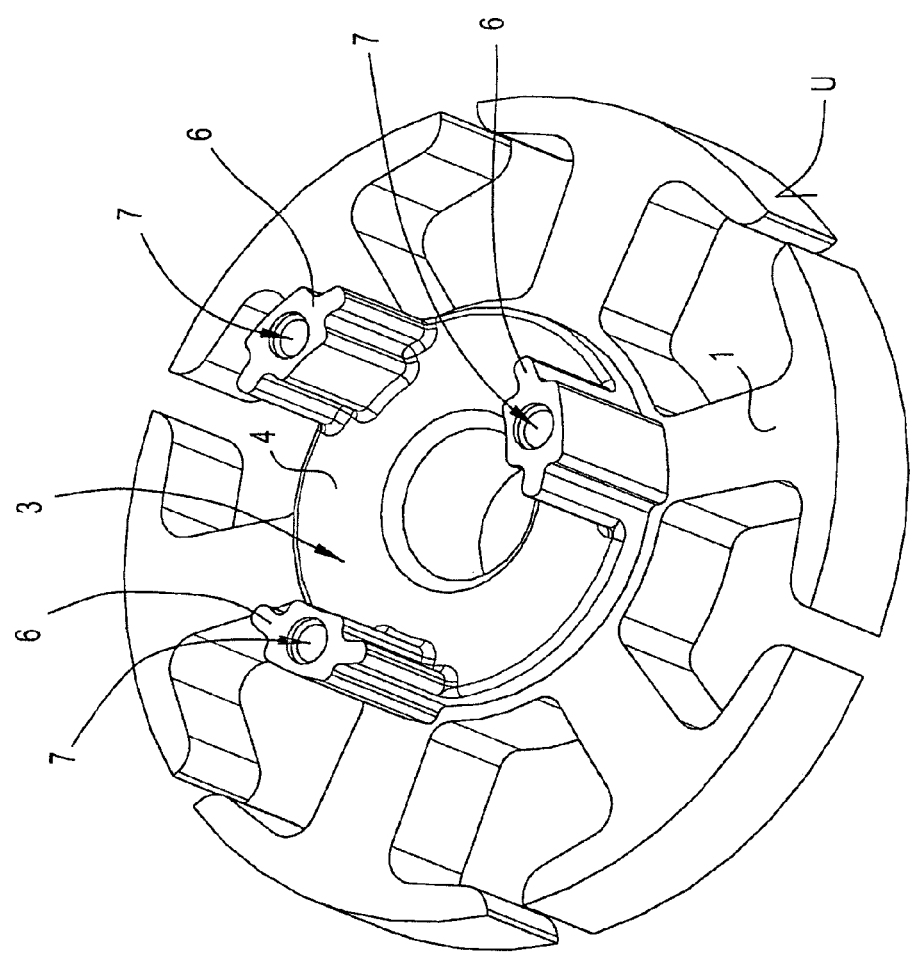

The stator bushing 3 is composed of metal, preferably of aluminum or steel. In a first assembly step, the bushing 3 is pressed into the interior of the stator S, that is to say into the axial opening 2 in the laminated stator core 1. FIG. 2 in this case shows the unit that is created after it has been pressed in, comprising the laminated stator core 1 and the stator bushing 3.

Figure 3:
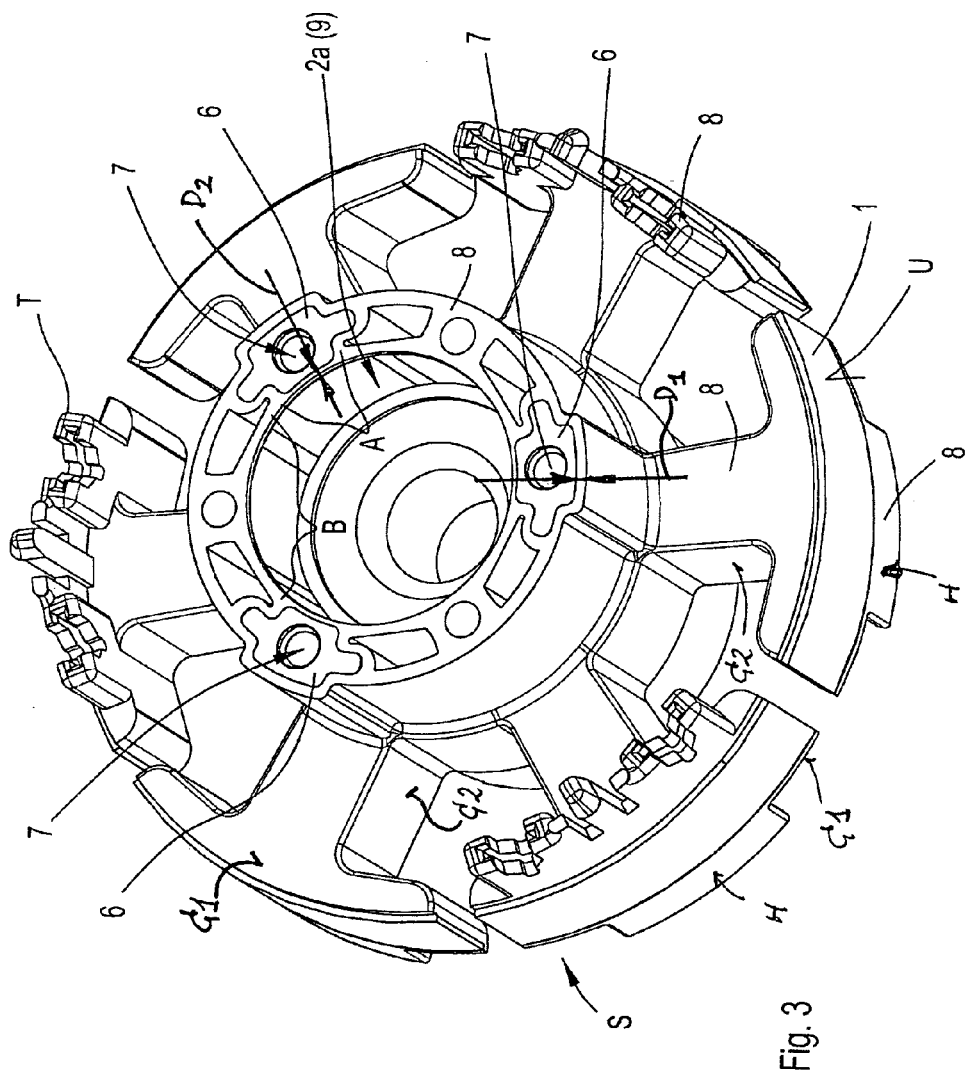

As FIG. 3 shows, once the unit comprising the laminated stator core 1 and the stator bushing 3 has been pressed in, it is encapsulated or extrusion-coated with plastic, thus resulting in a common sheath 8, which is composed of plastic and forms the insulation, and which surrounds the unit, at least partially but preferably virtually completely.

This sheath 8 is thus not formed from separate insulating components in the manner which is known, as mentioned in the introduction, for example from the prior art as insulating end plates which can be plugged on, but, in addition to the positively-locked enclosure of the unit comprising the laminated stator core 1 and the stator bushing 3, this also results in a cohesive adhesive connection between the unit and the insulation which, according to the invention, is provided by the coating which forms sheath 8.

Such a coating which forms sheath 8 can in this case be distinguished, for example, from a whirl-sintered layer, which represents an insulation layer similar to a varnish coating but which is, however, harder than a varnish layer. A whirl-sintered layer, in the same way as a varnish layer, is thin in comparison to the extrusion coating which forms sheath 8 according to the invention, and its maximum thickness is normally about 400 μm. When, by way of example, a stator is covered with this layer, the edges in particular thus form critical points since, by virtue of the manufacturing techniques, the coating does not adhere at these points, so that the insulation layer of sheath 8 can be interrupted.

In contrast, the extrusion coating of sheath 8 according to the invention offers the capability to cover the edges as well as the shape of the stator S according to the invention, that is to say, by way of example, to determine its inner and outer contours in any desired manner over a wide range.

The extrusion coating of sheath 8 can in this case be manufactured with a freely variable defined thickness D, with the minimum thickness $D_{min}$ of the sheath 8 preferably being intended to be greater than 0.45 mm, and preferably greater than 1.00 mm.

Figure 4:
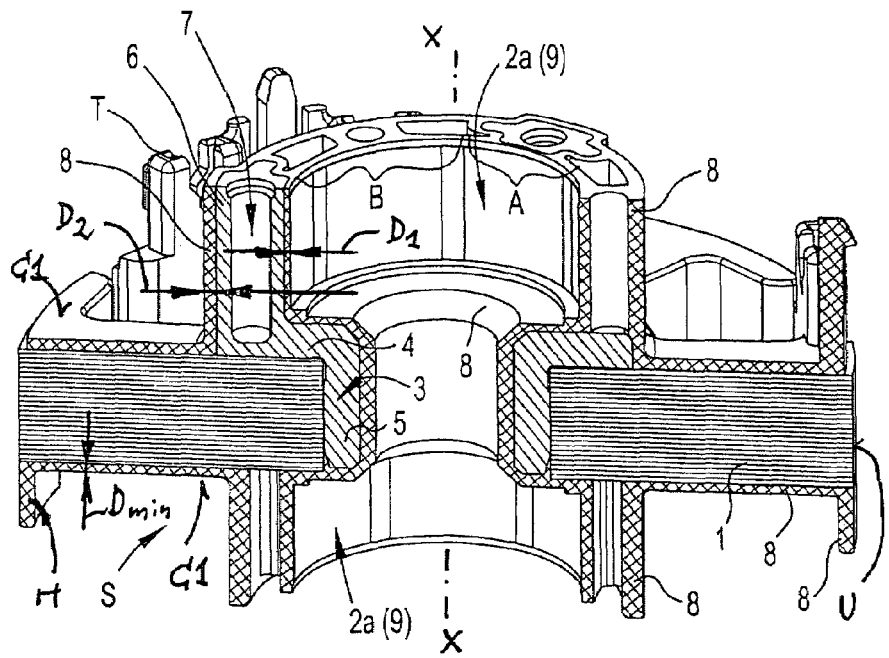
FIG. 4 shows a longitudinal section through a stator according to the invention.

The thickness D can in this case also preferably assume different values at different points on the sheath 8, as is illustrated by way of example in FIGS. 3 and 4. For example, the thickness D of the sheath 8, measured in the radial direction (relative to the longitudinal center axis of central axial opening 2) and represented by the reference symbol $D_1$ on the inside of the attachments 6, whose end face is not covered by the sheath 8, is by way of example less than on the radial outer face of the attachment 6, measured in the radial direction as is indicated by the reference symbol $D_2$.

With regard to the laminated stator core 1, which has a toothed shape, this may have a different minimum thickness $D_{min}$ of the extrusion coating 8 on its opposed radial face surfaces which are located on the cross section with respect to the longitudinal axis X-X (annotated by C1 in FIGS. 3 and 4) than on its axial face surfaces which are located in the longitudinal section with respect to the longitudinal axis X-X (annotated by C2 in FIG. 3). The minimum thickness $D_{min}$ in the surfaces C1 may in this case preferably be greater than 1.00 mm, while in the surfaces C2 it can preferably be greater than 0.45 mm, thus providing more space for the end winding (designated by the reference symbol 12 in FIG. 5) between the teeth.

With regard to the possible shaping according to the invention of the stator S by the extrusion coating of sheath 8, a bearing seat for a rotor shaft (which is designated by the reference symbol 10 in FIG. 5) can be formed in this way in the axial opening 2 in the laminated stator core 1 or in an opening 2a which is surrounded by sheath 8 and is arranged coaxially with respect to the opening in the laminated stator core 1. In particular, in this case, the bearing seat may be formed by bearing holders for ball bearings 11, with these bearing holders being arranged in the axial direction (line X-X in FIG. 5) on both sides of the laminated stator core 1 and being designated by the reference symbol 9 in FIGS. 3 and 4. There is therefore no need for a separate bearing supporting tube.

As illustrated in FIGS. 3 and 4, it is also possible for the stator bushing 3 and the sheath 8, seen in the radial direction, to form dimensionally stable areas A which are located (in particular in the area of the attachments 6 on the stator bushing 3) and elastic areas B (in particular in the area between the attachments 6). This ensures a long bearing life.

FIGS. 3 and 4 in this case also show that it is advantageously possible to form pockets T, for example for holding plug-in connecting contacts for the windings around the laminated stator core 1, or mechanical connecting elements, for example for latching, integrally with the rest of the extrusion coating forming sheath 8.

In addition, as illustrated in FIGS. 3 to 5, holding webs H can be formed for the end winding 12 of the stator S, thus stabilizing the position of the stator winding.

With the exception of its outer circumferential surface U, the laminated stator core 1 is preferably completely extrusion coated to form sheath 8, and there is no longer any need for any further insulation for the winding wires which are used on the stator according to the invention (in FIG. 5, the end winding and the stator winding as already mentioned are designated by the reference symbol 12) from the laminated stator core 1. According to the invention, a thermoplastic which is resistant to the temperatures which occur in the motor during use can advantageously be used for sheath 8, that is to say in particular a thermoplastic with a softening temperature of more than 150° C., preferably of more than 180° C., such as polyamide.

As already mentioned, FIG. 5 shows a radial fan whose electric motor has a stator according to the invention. The rotor shaft 10 is mounted in the stator by ball bearings 11, which form the bearing elements. The rotor is designated in its entity by the reference symbol R, and the stator according to the invention, as already mentioned, by S. A board 13 with circuit electronics 14 is arranged on the stator S. The rotor R and the stator S have a cover 15 over them.

The electric motor is mounted on a fan housing 17 by means of attachment screws 16. The impeller 18, which has an axial air inlet LE and a radially directed air outlet LA, is located within this fan housing 17. When a metallic fan housing 17 is used, a metallic, that is to say electrically conductive connection, is formed via the attachment screws 16 between the laminated stator core 1 and the fan housing 17 by which the laminated stator core 1 is grounded.

As is already evident from the above statements, the present invention is not restricted to the illustrated exemplary embodiments but also covers all means and measures with the same effect in the sense of the invention. It is thus self-evident that not only a radial fan may have an electric motor with a stator according to the invention, but also other apparatuses which can be driven by electric motors.

The encapsulation with plastic to form sheath 8 holds the encapsulated parts together, that is to say in particular that the laminated stator core 1 and the stator core 3, while on the other hand in each case form a holding space (bearing holder 9) for bearing elements on the inside and on both sides of the laminated stator core 1, while forming insulation for the winding on the outside. The bearing elements are thus electrically insulated from the laminated stator core 1. In addition to electrical insulation of the bearing elements, thus avoiding bearing components, the extrusion coating of sheath 8 in this case also advantageously provides sound-proofing for the running noise.

Furthermore, the invention is not restricted to the feature combination defined previously but can also be defined by any other desired combination of specific features of all the individual features disclosed overall.

The invention claimed is:

1. A stator of an electric motor, comprising:
a laminated stator core which is provided with an electrical insulation sheath composed of plastic;
a stator bushing positioned in a central axial opening in the laminated stator core forming a bearing seat for a rotor shaft, the stator bushing composed of metal,
wherein the laminated stator core and the stator bushing are at least partially surrounded by the sheath,
wherein the stator bushing has post attachments with threaded holes aligned parallel to the axis of the central axial opening.

2. The stator as claimed in claim 1, wherein the stator bushing is composed of aluminum.

3. The stator as claimed in claim 1, wherein the stator bushing is composed of steel.

4. The stator as claimed in claim 1, wherein the bearing seat is formed by bearing holders for ball bearings, which are arranged on both sides of the laminated stator core in the axial direction.

5. The stator as claimed in claim 1, wherein the laminated stator core is surrounded completely, with the exception of its outer circumferential surface, by the sheath.

6. The stator as claimed in claim 1, wherein the sheath has different values of its thickness at different points.

7. The stator as claimed in claim 6, wherein the minimum thickness ($D_{min}$) of the sheath is not less than 0.45 mm.

8. The stator as claimed in claim 6, wherein the minimum thickness ($D_{min}$) of the sheath on the laminated stator core in the area of radially extending face surfaces are not less than 1.00 mm.

9. The stator as claimed in claim 6, wherein the minimum thickness ($D_{min}$) of the sheath on the laminated stator core in the area of axially extending face surfaces of the laminated stator core is not less than 0.45 mm.

10. The stator as claimed in claim 1, wherein the sheath is composed of a thermoplastic with a softening point of at least 150° C.

11. A stator of an electric motor, comprising:
a laminated stator core which is provided with an electrical insulation sheath composed of plastic;
a stator bushing positioned in a central axial opening in the laminated stator core forming a bearing seat for a rotor shaft, the stator bushing composed of metal,
wherein the laminated stator core and the stator bushing are at least partially surrounded by the sheath,
wherein the stator bushing has post attachments and dimensionally stable areas are located in the area of the attachments on the stator bushing, and elastic areas are formed by the stator bushing and the sheath in the area between the attachments.

12. The stator as claimed in claim 11, wherein the bearing seat is formed by bearing holders for ball bearings, which are arranged on both sides of the laminated stator core in the axial direction.

13. The stator as claimed in claim 11, wherein the laminated stator core is surrounded completely, with the exception of its outer circumferential surface, by the sheath.

14. A stator of an electric motor, comprising:
a laminated stator core which is provided with an electrical insulation sheath composed of plastic;
a stator bushing positioned in a central axial opening in the laminated stator core forming a bearing seat for a rotor shaft, the stator bushing composed of metal,
wherein the laminated stator core and the stator bushing are at least partially surrounded by the sheath,
wherein pockets, holding webs for a stator winding are formed by the sheath.

15. The stator as claimed in claim 14, wherein the bearing seat is formed by bearing holders for ball bearings, which are arranged on both sides of the laminated stator core in the axial direction.

16. The stator as claimed in claim 14, wherein the laminated stator core is surrounded completely, with the exception of its outer circumferential surface, by the sheath.

* * * * *

UNITED STATES PATENT AND TRADEMARK OFFICE
CERTIFICATE OF CORRECTION

PATENT NO. : 7,586,228 B2  
APPLICATION NO. : 11/348631  
DATED : September 8, 2009  
INVENTOR(S) : Dieter Best It is certified that error appears in the above-identified patent and that said Letters Patent is hereby corrected as shown below:

On the cover page, item [73] under Assignee, after "PAPST", delete "Mulgingen" and insert --Mulfingen--.

Signed and Sealed this

Tenth Day of November, 2009

David J. Kappos
*Director of the United States Patent and Trademark Office*